United States Patent [19]

Varian

[11] 3,838,310

[45] Sept. 24, 1974

[54] AUTO CENTERING FOR MULTIPLE TUBE TELEVISION COLOR CAMERAS

[75] Inventor: George R. Varian, Palo Alto, Calif.

[73] Assignee: Ampex Corporation, Redwood City, Calif.

[22] Filed: Mar. 23, 1973

[21] Appl. No.: 344,215

[52] U.S. Cl. .......................... 315/13 R, 178/5.4 M

[51] Int. Cl. .......................... H01j 29/70

[58] Field of Search .......... 178/5.4 M, 5.4 R, 5.2 A; 315/276 D, 27 R, 13 C, 13 R

[56] References Cited

UNITED STATES PATENTS

| | | | |
|---|---|---|---|
| 3,536,824 | 10/1970 | Chmillon | 178/5.4 M |
| 3,705,839 | 12/1972 | Taylor | 178/5.4 M |

FOREIGN PATENTS OR APPLICATIONS

| | | | |
|---|---|---|---|
| 1,266,336 | 3/1972 | Great Britain | 178/5.4 M |

*Primary Examiner*—Maynard R. Wilbur

*Assistant Examiner*—J. M. Potenza

[57] ABSTRACT

An automatic centering system is provided for multiple tube color cameras utilizing a plurality of channels of electronics, wherein at least one channel generates a signal which is the first derivative of either the red, green or blue color video signal introduced into the channels from a video color camera. In one embodiment of the centering circuit, the red and blue color signals are introduced to respective channels of the system, and each are multiplied by the first derivative of the green color signal. The resulting pair of centering signals are integrated to provide error signals which represent the amount and direction of any mis-centering between the green component image and the red and/or blue component images respectively. In another embodiment of the centering circuits, the first derivatives of the red and blue signals are each multiplied by the green color signal. The resulting pair of centering signals are integrated to provide error signals which represent the amount and direction of any mis-centering between the green and red and/or blue component images. Either of the embodiments may be used to correct vertical and/or horizontal mis-centering. In either embodiment, any mis-centering in either the vertical or horizontal direction is used to control up/down counter means, whereby a corresponding analog correction signal is supplied, via digital-to-analog means, to the scanning apparatus of the respective camera tubes.

14 Claims, 18 Drawing Figures

PATENTED SEP 24 1974

SHEET 3 OF 5

3,838,310

AUTO CENTERING FOR MULTIPLE TUBE TELEVISION COLOR CAMERAS

BACKGROUND OF THE INVENTION

1. Field

The invention relates to automatic centering devices for color cameras, and particularly to a horizontal/vertical centering system wherein the first derivative of at least one video color signal is multiplied by the other color signals, to effect a correlation process indicative of any mis-centering between the component color images in a color camera.

2. Prior Art

A multiple tube color television camera is correctly registered when the signals from each camera tube relative to any point in the scene are coincident in time. In registration or centering error correction systems one of the camera tubes is selected as a reference or "master" tube and the remainder of the tubes are designated as "slave" tubes. The system determines the direction of misregistration between the slave tubes and the master tube images. The resulting correction signals are introduced to the vertical and horizontal scan apparatus of each slave tube, whereby coincidence between corresponding samples from the master tube and each of the slave tubes is restored.

There are various concepts and associated apparatus for providing the detection and correction of vertical and horizontal misregistration. Since misregistration is generally a problem only in multiple tube cameras, the present invention is concerned mainly with color cameras having two or more camera tubes.

Typical of a color camera with automatic centering correction system is one wherein coincidence, in time of transitions which represent picture detail, in the output signals from two camera tubes, forms the basis of the detection technique. In the case of a detector operating in the horizontal direction, the picture detail is selected by differentiating each tube output signal The degree of coincidence or registration is measured by subtracting the differentiated slave tube output from the differentiated master tube output and then full wave rectifying the difference. The result is a minimum at the point of maximum coincidence of detail, i.e., at the point of optimum registration. Subsequent integration provides a detector output proportional to the algebraic average of registration errors. The output of the detector can be made to correspond to a predetermined portion within the picture if suitable gating, or blanking, inputs to the circuit are used. To resolve vertical registration errors, a system of vertical scanning is simulated which generates the required field waveforms. A field waveform is produced from each camera tube output and is subjected to a signal processing system such as that outlined above for the detection of horizontal registration errors. However, the derivative of a field waveform corresponds to the horizontal edges in a picture and thus the latter system provides an indication of any vertical offset between images from the master and slave tubes.

The above system utilizes delay lines to provide subtraction of the differentiated slave tube output from the differentiated master tube output. Another system utilizing delay lines, provides automatic registration correction by employing the principal of derivation of correlation coefficients relating to corresponding discontinuities in the luminance signal and in the color signals (as in a four-tube camera) wherein the correlation coefficients are a maximum when the different channels are optimumly registered. In this system the derivatives of the picture information from two channels are used to provide information which may be compared in the correlation process. By way of example, in a horizontal error detector this process involves the use of short circuited delay lines with a delay of the order of 150 nanoseconds to provide derivatives and ramp waveforms for time measurement. As noted above, the correlation principal of the latter system also utilizes delay lines to provide derivatives and ramp waveforms for time measurement.

In a further system for automatic registration correction of color television cameras, registration of the tubes in a multi-tube camera is obtained by time comparing separable signals obtained in the tube output. The signals are derived by electrically traversing spaced reference areas which are located within the scanned area, but outside the picture area. The signals occur simultaneously when the tube is in register, whereby departure from simultaneity is automatically utilized by the circuit to adjust the scanned area in position and dimensions so as to substantially restore registration.

In still another system, vertical registration correction apparatus separates a derived television signal into a main line component and adjacent line components, subtracts the adjacent line components from the main line component, and combines the different signals to produce a vertical correction signal. Before combining the vertical correction signal with the main line component of the video signal to produce a vertically equalized signal, the correction signal preferably is amplitude modulated by the main line component of the video signal which is passed through an amplitude-sensitive modulation circuit. The modulation of the correction signal by the main line component signal is accomplished in such fashion to preclude blacker-than-black and whiter-than-white overshoots when the two signals are combined. The latter system likewise utilizes delay lines to provide once and twice delayed line components of the derived television signal.

Accordingly, it may be seen that typical prior art registration correction systems generally employ delay lines, wherein an absolute comparison between delay lines of various channels is required. Thus matched channels are required in order to preclude the generation of an error signal caused by an inaccurate comparison between delay lines of different channels, which inaccuracy would give rise to an incorrect misregistration signal. That is, any offset in gain, etc., between the channels would generate a like offset in the error signal output, erroneously indicating a mis-centering when there actually is none. Further, in the condition where a large signal is introduced to one channel with a relatively small (or zero) signal introduced to a second channel, any offsets in the difference amplifier, the filters, the delay lines, or in the detectors normally associated with the delay line type of system, will generate an error signal which incorrectly indicates a misregistration.

In addition, the use of matched channels as in the delay line approach, necessitates a more complex design utilizing relatively complex and expensive filters, and requires a generally greater space resulting in a more bulky camera.

SUMMARY OF THE INVENTION

The present invention provides a relatively simple automatic centering system for use in multiple tube color cameras which employs a correlation process while precluding the use of delay lines.

In the horizontal correction portion, the red (R), green (G) and blue (B) color signals are introduced to respective highpass filters which eliminate low frequency components which are not related to video picture transitions. A chopper (i.e., transistor switch) circuit is coupled to the G signal, wherein the chopped signal is introduced to means for obtaining the first derivative of the green signal. The outputs from the red and blue highpass filters are each multiplied by the first derivative of the green signal to provide a pair of (error) signals indicative of any mis-centering between the green, and the red or blue signals, respectively. The signals are integrated and introduced to respective comparator means, whereby comparison with a re-established reference level provides an up or down count to an up/down counter means, depending upon the direction of any detected mis-centering. The counter output is delivered to a ladder resistance means which functions as a digital-to-analog (D/A) converter. The resulting analog voltage levels comprise the correction signals introduced to the tube scan circuits for correcting horizontal mis-centering between camera tubes.

The vertical centering portion of the invention corresponds generally to that of the horizontal centering portion, but further includes sample/hold circuit means for receiving the red, green and blue color signals prior to their introduction to the red, green and blue bandpass filters. The transistor switch circuit is coupled to the sample/hold circuit means of each channel. The sample/ hold circuit means provides a vertical sampling down a selected strip of the video picture in response to the transistor switch circuit to provide vertical information from line to line at the line rate.

DESCRIPTION OF THE PREFERRED EMBODIMENTS

Figure 1:
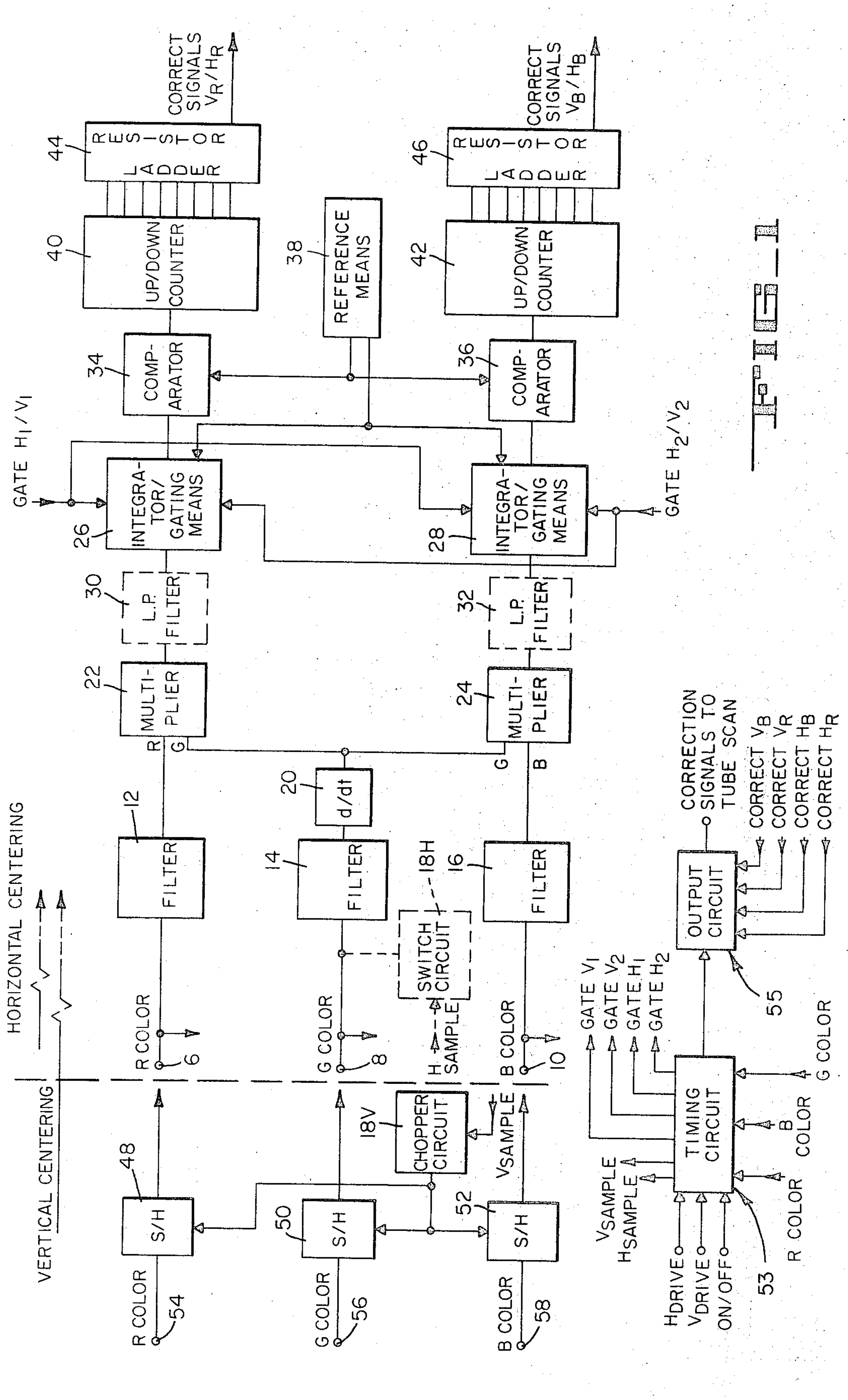
FIG. 1 is a block diagram depicting both the horizontal and vertical centering circuits, as well as the timing and output circuits, of the invention.

Referring to FIG. 1, the block diagram depicts both the vertical and horizontal centering circuits of the automatic centering system in accordance with the invention. As shown in FIG. 1, the vertical circuit is essentially the same as the horizontal circuit, but includes the insertion of sample/hold circuits prior to the input of the horizontal circuit, with alternate modifications as further described below.

Referring first to the horizontal centering circuit, the conventional red (R), green (G) and blue (B) color signals generated by a multiple tube video color camera (not shown), are fed via input terminals 6–10 to highpass filters 12, 14, 16 respectively of the corresponding R, G and B channels. The green (G) color signal is the common signal in this example, and the G channel is coupled to a transistor switch circuit 18H shown here in phantom line since it is not employed in the vertical centering circuit. The highpass filters 12–16 remove low frequency components which are not related to video picture transitions, from the color signals prior to taking the first derivative or performing the multiplication process. A horizontal sample signal, herein termed $H_{SAMPLE}$ is fed to the switch circuit 18H to provide blanking of one of the channels, e.g., the G channel, to establish a zero reference level to thereby remove any D.C. offsets or drifts and their inherent problems. The highpass filter 14 is coupled to means 20 for providing the first derivative of the G color which, in turn, is fed as one input to both the (R and B) multipliers 22, 24 respectively. The highpass filters 12, 16 are operatively coupled to the second inputs of multipliers 22, 24 whereby the R and B color inputs are provided to respective multipliers. Multiplying both the R and B signals by the first derivative of the G signal generates horizontal (error) R and B signals, which are proportional to existing mis-centering between the red and green, and/or the blue and green color signals. The R and B error signals are introduced from multipliers 22, 24 to integrator/gating means 26, 28 via lowpass filters 30, 32 respectively. Means 26, 28 provide amplification, integration and switching (gating) stages, wherein gating is effected via gating pulses from a timing circuit (53), herein termed GATE H1 and GATE H2, introduced to each means 26, 28. (Note that GATES V1 and V2 for the vertical centering circuit are also shown in FIG. 1.) The various SAMPLE and GATE inputs to the horizontal (and vertical) circuits provide system blanking to allow selected sampling during an electronic window within the video picture, while also re-establishing the DC reference level of the AC coupled signals, as further described infra.

The error signals from integrator/gating means 26, 28 are introduced to comparators 34, 36, which provide a voltage comparison thereof with selected reference threshold levels provided via reference means 38. If the error signals delivered to comparators 34, 36 respectively are greater than the selected upper threshold reference from reference means 38, then the respective comparator provides an output to associated up/down counter means 40 or 42, which makes the latter count down. If the error signals are less than the selected lower threshold level, the respective counter means 40 or 42 will count up. The digital words from counter means 40, 42 are introduced to ladder resistors 44, 46 respectively which act as digital-to-analog (D/A) converters. The resulting analog (error) correction voltages $H_r$, $H_B$ are proportional to any mis-centering of the R and/or B color signals with respect to the G color. Introduction of the voltages to the corresponding horizontal scan circuits of the respective red and blue tubes of the color camera provides correction of any miscentering thereof with respect to the green color tube.

The vertical centering circuit of the invention is generally similar to the horizontal centering circuit of previous description, but the former further provides sample/hold circuits 48, 50 and 52 at the input to the horizontal circuit. That is, sample/hold circuits 48–52 are disposed between the input terminals 54–58 of the three color signals RGB from the color camera, and the bandpass filters 12–16. The transistor switch (chopper) circuit 18H is deleted and replaced with a chopper circuit 18V coupled to each of the sample/hold circuits 48–52 of the RGB channels respectively. The sample/-hold circuits 48–52 provide means for sampling the color signals along a vertical sampling strip down the middle of the window (or the video picture) to provide vertical informaiton down the picture from line to line. In the vertical circuit of the invention, a vertical sample input ($V_{SAMPLE}$) is delivered to chopper circuit 18V, while GATES V1 and V2 are delivered to the integrator/gating means 26, 28 from the timing circuit 53.

Although the green color channel is herein depicted in both the vertical and horizontal circuits as the common circuit, wherein the first derivative of the G color is provided for multiplication with the red and blue color signals respectively, it is to be understood that the green color signal may be multiplied by the first derivatives of the red and blue color signals instead. That is, in accordance with the invention concepts, the first derivative of at least one color signal is multiplied by each of the remaining color signals, or the first derivatives of two signals are multiplied by the remaining color signal or signals, etc. In the more detailed schematics of this exempliary apparatus (FIGS. 2 and 3) the horizontal centering circuit correlates the first derivative of the G color with the R and B colors, whereas the vertical centering circuit correlates the first derivatives of the R and B colors with the G color signal.

The block diagram of FIG. 1 further includes the timing circuit 53, and an output circuit 55 comprising a multiplexer circuit, of the invention combination. Inputs $H_{DRIVE}$, $V_{DRIVE}$ and ON/OFF are introduced to the timing circuit from the conventional tube control circuits. The RGB color signals are also introduced to the timing circuit 53 from either the horizontal or vertical centering circuits and along with the ON/OFF input provide an adjunct circuit for disabling the system in case of image tube overload. Timing circuit 53 provides outputs $V_{SAMPLE}$ and $H_{SAMPLE}$, as well as the GATES V1, V2, H1, H2 to the horizontal and vertical centering circuits. The output circuit 55 is an adjunct feature and comprises a multiplexer circuit, whereby the correction signals $V_B$, $V_R$, $H_b$, $H_R$ introduced thereto, are multiplexed on one wire of the cable which extends to the camera head.

Figure 2:
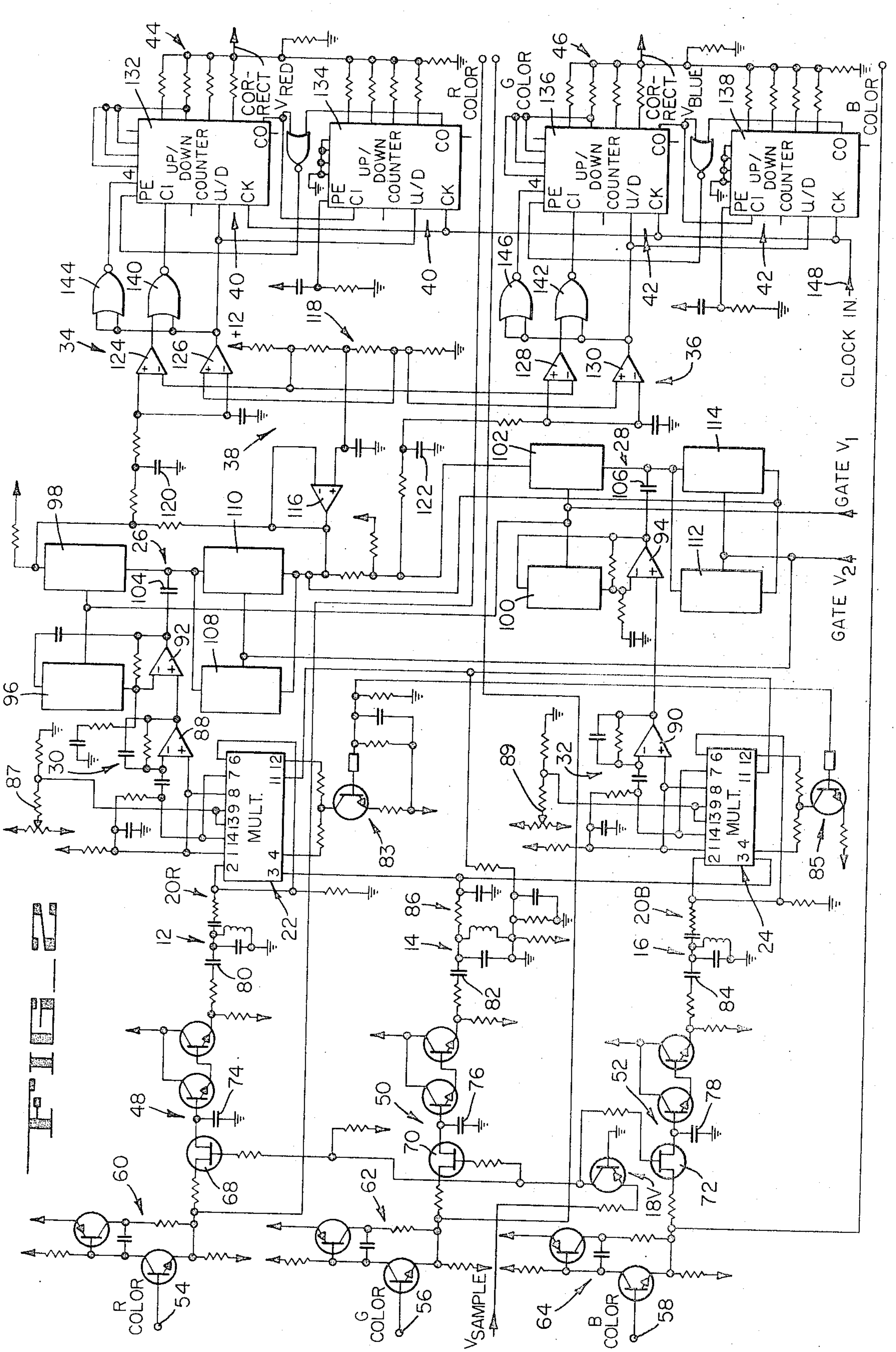
FIGS. 2, 3 and 4 are schematic diagrams of the vertical, the horizontal, and the timing and output circuits of FIG. 1.
Figure 6:
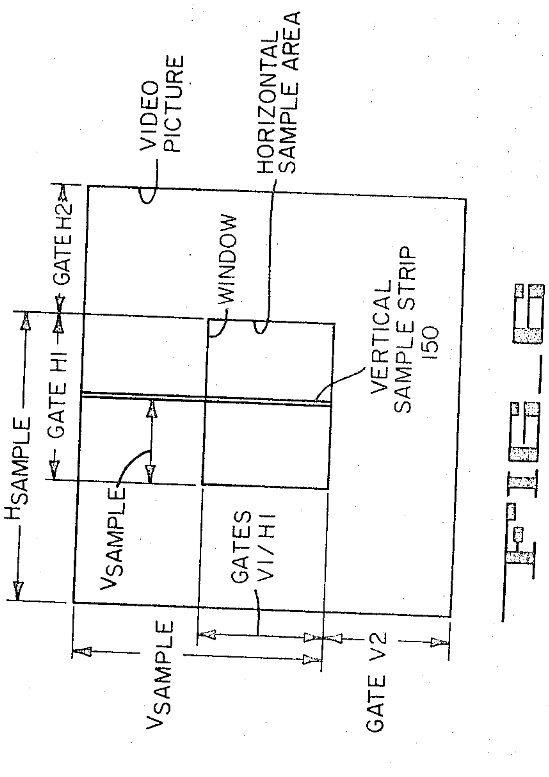
FIG. 6 is a simplified view of a video picture depicting the electrical "window" during which the various sampling is performed to determine any vertical and/or horizontal mis-centering.

Referring to FIG. 2, the vertical centering circuit of the invention combination is shown in greater detail. As briefly discussed in the block diagram of FIG. 1, the R, G and B color signals are introduced to respective sample/hold circuits 48, 50, 52 via respective inputs 54–58 and input amplifier circuits 60–64, which provide isolation of the input signal. The sample/hold circuits 48–52 provide sampling of incoming color signals in response to the transistor switch, i.e., chopper 18V, whose output is coupled to respective FETs 68–72 of the sample/hold circuits. The chopper 18V is gated via the input herein termed $V_{SAMPLE}$ derived from the timing circuit shown in FIG. 4. The sample/hold circuits 48–52 thus provide means for sampling video information along a vertical strip extending down the middle of the video picture, i.e., preferably down the middle of a selected window, in response to $V_{SAMPLE}$ (FIG. 6). Capacitors 74–78 of the sample/hold circuits are charged to the value of the respective incoming signal, and each is held at the existing voltage when the associated FET is turned off until such time the FET is turned on again. The sample pulse is deleted during a portion of the field, which provides zero reference levels in the R and B channels prior to the correlation process. The reference level is used to re-establish the D.C. level of the error signal after A.C. coupled amplification.

The chopped R, G and B signals are coupled to the bandpass filters 12-16 respectively via capacitors 80-84, which remove low frequency components which are not related to the picture transitions, and which smooth the sharp transitions caused by the sampling process. The filtered G color signal is introduced to resistor/capacitor network 86, while the filtered R and B color signals are fed to means 20R and 20B respectively for obtaining the first derivatives of the respective color signals. The first derivatives are introduced as one of the inputs to respective multipliers 22, 24, while the G color signal is delivered to the other input of each multiplier via the resistor/capacitor network 86. The multipliers 22, 24 are conventional doubly balanced multiplier circuits, such as the Model CA3054 manufactured by RCA.

Figure 5:
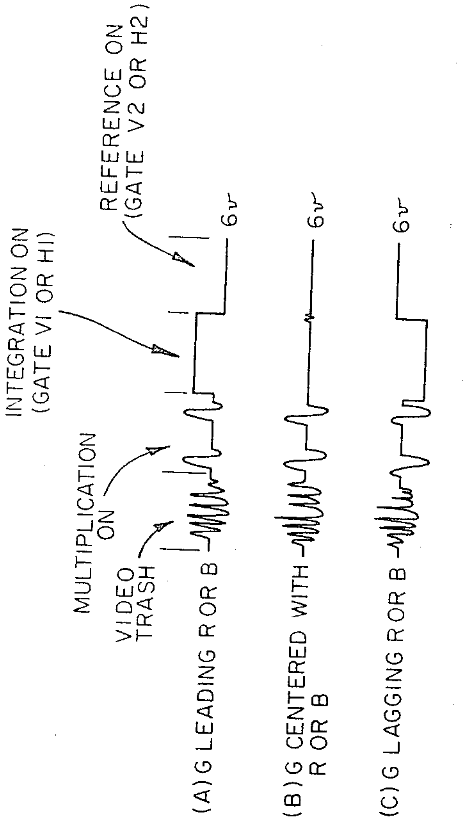
FIGS. 5A-C are a series of graphs depicting waveforms generated at various points along the circuits of FIGS. 1-3.

The multipliers 22, 24 generate a pair of waveform reversals or transitions which are shifted with respect to the zero reference level in proportion to the extent that the red or blue color signals are leading or lagging the G color signal. That is, in the vertical centering circuit, the multiplier outputs define waveform transitions which are shifted to a more positive value with miscentering in one direction, and are shifted to the opposite or negative value with mis-centering in the other direction. In the present example, the waveform transition of either the R or B vertical channel shifts positive with respect to the zero reference when the G color signal leads the R or B color signal (FIG. 5A). On the other hand, the waveform transition of the R or B channel is shifted to the negative side of the zero reference when the G color signal lags the R or B color signal (FIG. 5C). When the G and the R or B color signals are centered, the waveform transition is symmetrical about the zero reference level (i.e., is zero) (see FIG. 5B). Transistors 83, 85 and dividers 87, 89 are conventional current sources coupled to the multipliers 22, 24 respectively.

The resulting pair of outputs from the multipliers 22, 24, which represent existing vertical centering errors, are introduced to respective integrator/gating circuits 26, 28 via lowpass filters 30, 32 respectively. Although not required for practical circuit operation, the filters 30, 32 (shown in phantom in the block diagram of FIG. 1) reduce the excursions which the subsequent amplifiers see, i.e., they provide an increase in the dynamic range of the system since the pulses being handled are narrow duty pulses. More particularly, the outputs from multipliers 22, 24 are amplified via first operational amplifiers 88, 90 respectively. Amplifiers 88, 90 are operatively coupled to second operational amplifiers 92, 94 respectively, each of which are coupled to a bilateral switch or transmission gate 96, 98 and 100, 102. The amplifier 92 and gate 96 form a gateable integrating circuit for the R channel whereas the amplifier 94 and gate 100 form a gateable integrating circuit for the B channel. Thus the integrator means of the integrator/gating circuits 26, 28 provide a selectively switched integration process during chosen periods of the signal which contain valid centering error information, while providing a gating window or window during which the error information is sampled.

Coupling capacitors 104, 106 are disposed between operational amplifiers 92, 94 and gates 98, 102 respectively, wherein gates 98, 102 provide sampling switches for the integrated and D.C. restored signals. In addition, the outputs from coupling capacitors 104 and 106 are also coupled to pairs of bilateral switches or transmission gates 108, 110 and 112, 114 respectively. Common junctions between gates 108, 110 and gates 112, 114 of the R and B channels respectively, are coupled to a reference operational amplifier 116 which, in conjunction with a voltage divider network 118, comprises the voltage reference means 38 of FIG. 1. The transmission gates 96, 98 and 100, 102 are gated on via a gating input thereto, corresponding to GATE VI of FIGS. 1 and 4. The transmission gates 108, 110 and 112, 114 are gated on via a second gating input corresponding to GATE V2 of FIGS. 1 and 4. Thus the integration process occurs during GATE V1, while the DC reference levels determined (restored) via divider networks 118, are provided to both channels during GATE V2 via closure of the gates 108, 110 and 112, 114. The gating means of the integrator/gating circuits 26, 28 provides, inter alia, switching circuits which allow the channels to re-establish the D.C. level of the respective signals from the AC coupled amplifiers.

By way of example, the transmission gates 96–102, 108–114 may be Model CD4016AE switches manufactured by RCA.

The integrated and DC restored outputs of channels R and B are introduced to respective coupling capacitors 104, 106, are restored to the desired DC levels via action of the capacitors 104, 106 and gates 108, 110, 112, 114, and are introduced to the comparators 34, 36 respectively via gates 98, 102 and holding capacitors 120, 122. The comparators 34, 36 include dual operational amplifiers 124, 126 and 128, 130 respectively. By way of example only, the low input to the amplifiers 124, 128 are coupled to a voltage threshold level greater than the reference level generated via the reference means 38 (i.e., divider networks 118), while the high inputs to amplifiers 126, 130 are coupled to a voltage threshold level which is lower than the reference level. The threshold levels which determind the limits of the voltage range of comparators 34, 36 are obtained from the voltage divider network 118. By way of example, the voltage reference level is 6 volts, the upper voltage threshold ($V_R$+) equals 6.5 volts, and the lower voltage threshold ($V_R$−) equals 5.5 volts.

The outputs from the comparators 34, 36 are introduced to the up/down counter means 40, 42 respectively, each of which comprise in this example two four-stage up/down counters 132, 134 and 136, 138 coupled together in generally conventional fashion. Amplifiers 126, 130 are coupled to the up/down (U/D) inputs of the counter means 40, 42 respectively, and also to NOR gates 140, 142. The other inputs to NOR gates 140, 142 are from amplifiers 124, 128 respectively. NOR gates 140, 152 are coupled to the carry-in (CI) inputs of the counters 132, 136. NOR gates 144, 146 are coupled from the amplifiers 126, 130 respectively to the pin 4 jam input of counters 132, 136. The connection of the jam inputs and the preset enable input prevents the counter from overflowing. Thus the output of NOR 140 prevents the counter from counting if the incoming voltage is a value between 5.5 and 6.5 volts. There is an output on amplifier 126, causing the counter means to count up when the input to the comparator rises above 6.5 volts, and down when the input decreases below 5.5 volts. The comparators 34, 36 of the R and B channels respectively function in similar manner.

Figure 3:
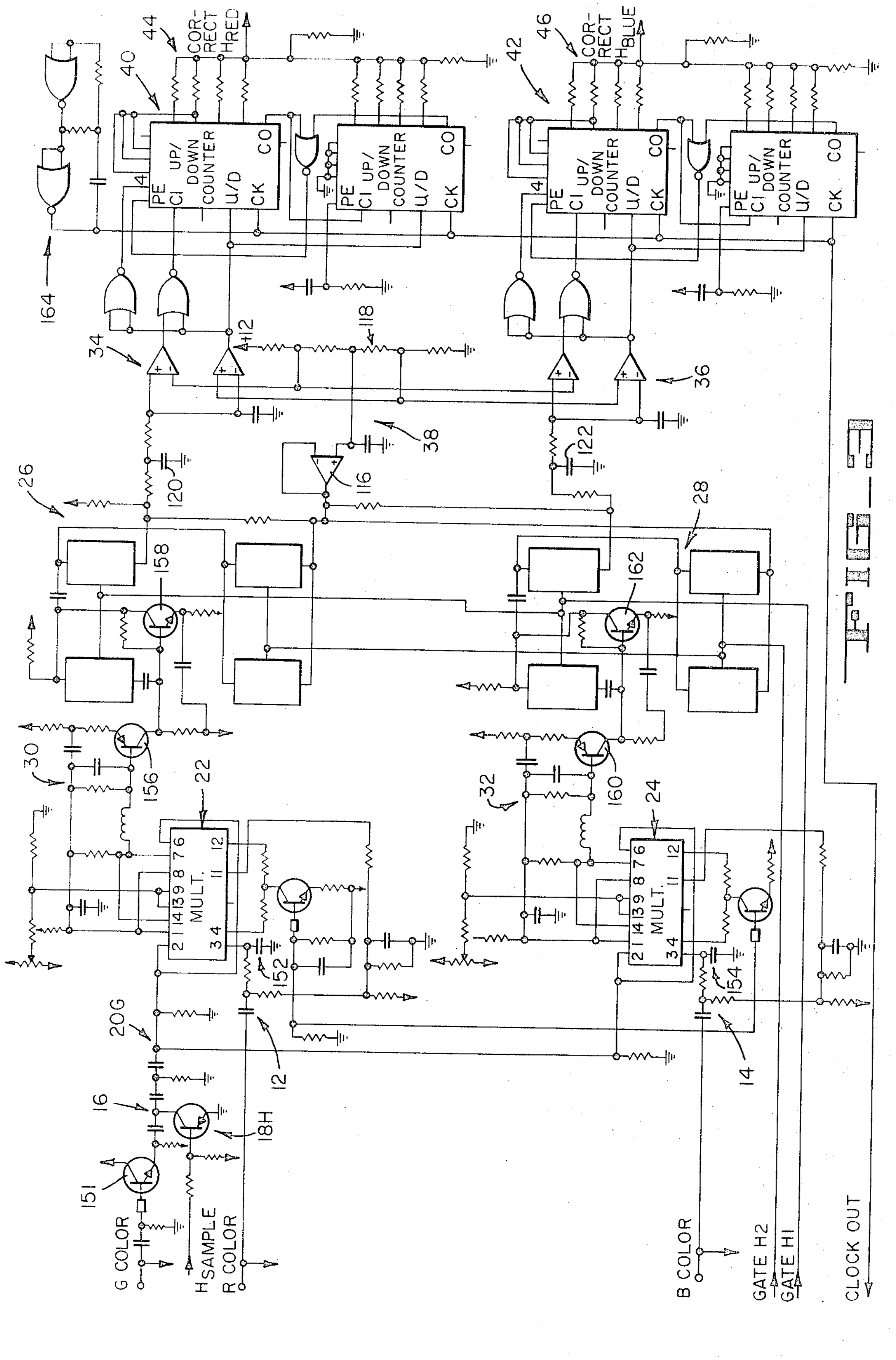

A CLOCK pulse is introduced via terminal 148 to the clock (CK) inputs of the counters 132–138, and is generated by a clock generating circuit 164, shown in FIG. 3. The combined counters 132, 134 and 136, 138 of the R and B channels respectively provide a plurality of separate buffered outputs, which are coupled to the ladder resistor circuits 44, 46. The outputs of the resistor circuits 44, 46 are introduced to the tube scan circuits (not shown) via the output circuit 55 of FIG. 4, to control the video raster vertical centering.

By way of example, the operational amplifiers 88–94, 124–130 may be Model MC-1458 manufactured by Motorola; the NOR gates 140–146 may be Model CD4001AE manufactured by RCA; the operational amplifier 116 may be Model UA741 manufactured by Fairchild; and the counters 132–138 may be Model CD4029AE manufactured by RCA.

Figure 7:
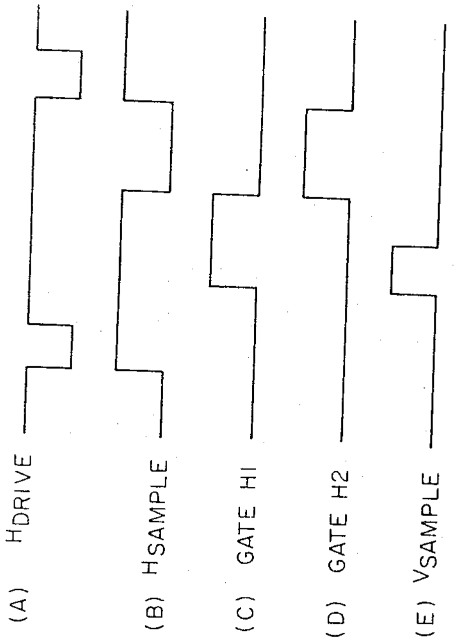
FIGS. 7A-E and 8A-E are graphs showing the waveforms of various timing signals generated in FIG. 4 and employed in the circuits of FIGS. 2 and 3, to provide sampling within the window period.
Figure 8:
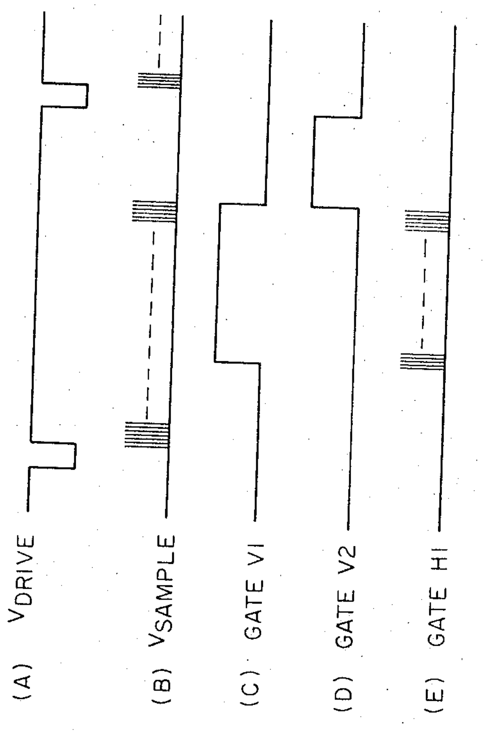

By way of further description of the invention combination, in operation, the R, G and B color signals define three channels in the vertical centering circuit of FIG. 2 and are introduced to the sample/hold circuits 48–52 respectively. The sampling signal $V_{SAMPLE}$ (generated by the circuit of FIG. 4 and depicted in FIGS. 7E and 8B) is used to drive the (transistor switch) chopper 18V and thus the FETs 68–72 to sample the R, G and B signals at the line rate. This provides sampling of the vertical information at the line rate while clamping the channels to provide thus associated zero reference levels. Since the system has a gain of the order of 100,000 from input to output, the chopper stabilization type of amplifier is preferable to allow measuring output signal excursions of the order of a few tenths of a volt. Accordingly, the zero reference levels are established prior to taking the derivative, or prior to performing the multiplication process. Further, the signals are AC coupled to remove any DC offsets to provide true zero reference levels in the channels.

As shown in FIG. 6, the vertical samples are taken along the vertical sample strip 150 at the end of the $V_{SAMPLE}$ period, during the first half of the window. The samples from the sample/hold circuits 48–52 are coupled via capacitors 80–84 and filters 12–16 to first derivative network 20R, resistor/capacitor network 86, and the first derivative network 20B, respectively. The first derivatives are each multiplied by the G color signal in respective multipliers 22, 24, and the product of the RG and BG signals are AC coupled to the integrator/gating circuits 26, 28 respectively. The three operating conditions for the vertical centering circuit of FIG. 2 are shown in FIGS. 5A–C; e.g., FIG. 5A depicts the operating conditions of either of the channels R and B when the G signal is leading the R or B color signals respectively; FIG. 5C depicts the conditions when the G color signal is lagging the R or B color signal; and FIG. 5B depicts the conditions when the R or B color signals are both centered with respect to the G color signal. Note that the integrator/gating circuits 26, 28 provide a stage of amplification via amplifiers 88, 90 as well as restoring of the D.C. reference.

It follows that when GATE VI gates on the transmission gates 96, or 100, (FIG. 8C) any value introduced to the amplifiers 92 or 94 is integrated. Thereafter GATE V1 is turned off, and GATE V2 is turned on (FIG. 8D) which turns on transmission gates 108, 110 or 112, 114. This action charges the holding capacitors 120, 122 in response to the reference voltage applied via the voltage divider network 118 and operational amplifier 116. In this example, the reference level is forced to a value of 6 volts, which re-establishes the zero reference level previously generated by chopping. The integrated, DC restored error signal from the center of the picture is gated into the holding capacitors 120, 122 via the previous GATE V1 and the transmission gates 98, 102. Holding capacitors 120, 122 have relatively long time constants, wherein the voltage level is detected by the comparators 34, 36 respectively. If the voltage is greater than the upper threshold preset by the voltage divider network 118 (6.5 volts), the differential amplifiers 126, 130 detect the voltage level and introduce a down count to the counter means 40, 42 respectively. If the voltage level of capacitors 120, 122 is less than the lower threshold preset on the voltage divider network 118 (5.5 volts), the amplifiers 126, 130 input an up count to the counters to cause them to count up. The voltage divider network 118 thus provides a one volt dead zone between the upper and lower threshold levels. If the voltage levels fed to the comparators 34, 36 are within this dead area, the comparators provide no U/D signal to the counter means 40, 42 which maintain the existing state.

The counter means 40, 42 count at a fixed rate determined by the clock frequency generated via the clock generating circuit 164 of FIG. 3, which in this particular example is 6 Hertz. Between each CLOCK pulse the counter means 40, 42 have sufficient time to determine whether it has counted too far or not far enough in either direction. The comparator signals decay to within the dead zone about the reference level of 6 volts, whereupon the counter stops counting with no output change. The counter means 40, 42 provide a digital number which is proportional to a correction voltage sufficient to reduce the error signal to within the dead zone of the comparators. The digital word is introduced to the ladder resistor circuits 44, 46 which act as D/A converters and generate analog voltages proportional to the numbers in the counter means.

Referring now to FIG. 3 there shown in greater detail the horizontal centering circuit of the invention combination which provides horizontal (error) correction signals, for correcting any mis-centering between the red and/or blue color signals and the green color signal in the horizontal direction. As previously mentioned in FIG. 1, the horizontal centering circuit of FIG. 3 is essentially similar to the vertical centering circuit of FIG. 2. The circuits are used together, but may be used separately.

However, in the horizontal circuit, the first derivative is generated in only the G color channel, which is multiplied by both the R and B color signals in respective multipliers 22, 24. Furthermore, there are no sample/-hold circuits in the horizontal centering circuit, and the chopper circuit 18V is replaced by a transistor switch 18H which is coupled into the G channel prior to the highpass filters 12–16 and prior to generating the first derivative. Accordingly, 20G designates the first derivative network, and resistor/capacitor networks 152, 154 are disposed in the R and B channels respectively, to thereby provide the first derivative of one color signal, which is subsequently multiplied by each of the remaining color signals. The remainder of the horizontal centering circuit of FIG. 3 is essentially similar to the vertical centering circuit of FIG. 2, wherein like components are similarly numbered in the figures. The amplifiers 88, 92 and 90, 94 of FIG. 2 have been replaced in FIG. 3 by individual transistors 156, 158 and 160, 162 respectively. However operation of the integrator means and gating means of the integrator/gating circuits 26, 28 is the same as described in FIG. 2. the horizontal centering circuit of FIG. 3 thus also generates red and blue (horizontal) (error) correction signals ($H_R$ and $H_B$) which are coupled to the output circuit 55 of FIG. 4, described hereinafter, for subsequent introduction to the video tube scan apparatus.

A clock pulse generator 164 is also shown in the horizontal centering circuit of FIG. 3 and provides CLOCK pulses to the clock inputs of the counter means 40, 42 for both the vertical and horizontal centering circuits of FIGS. 2 and 3 respectively.

Figure 4:
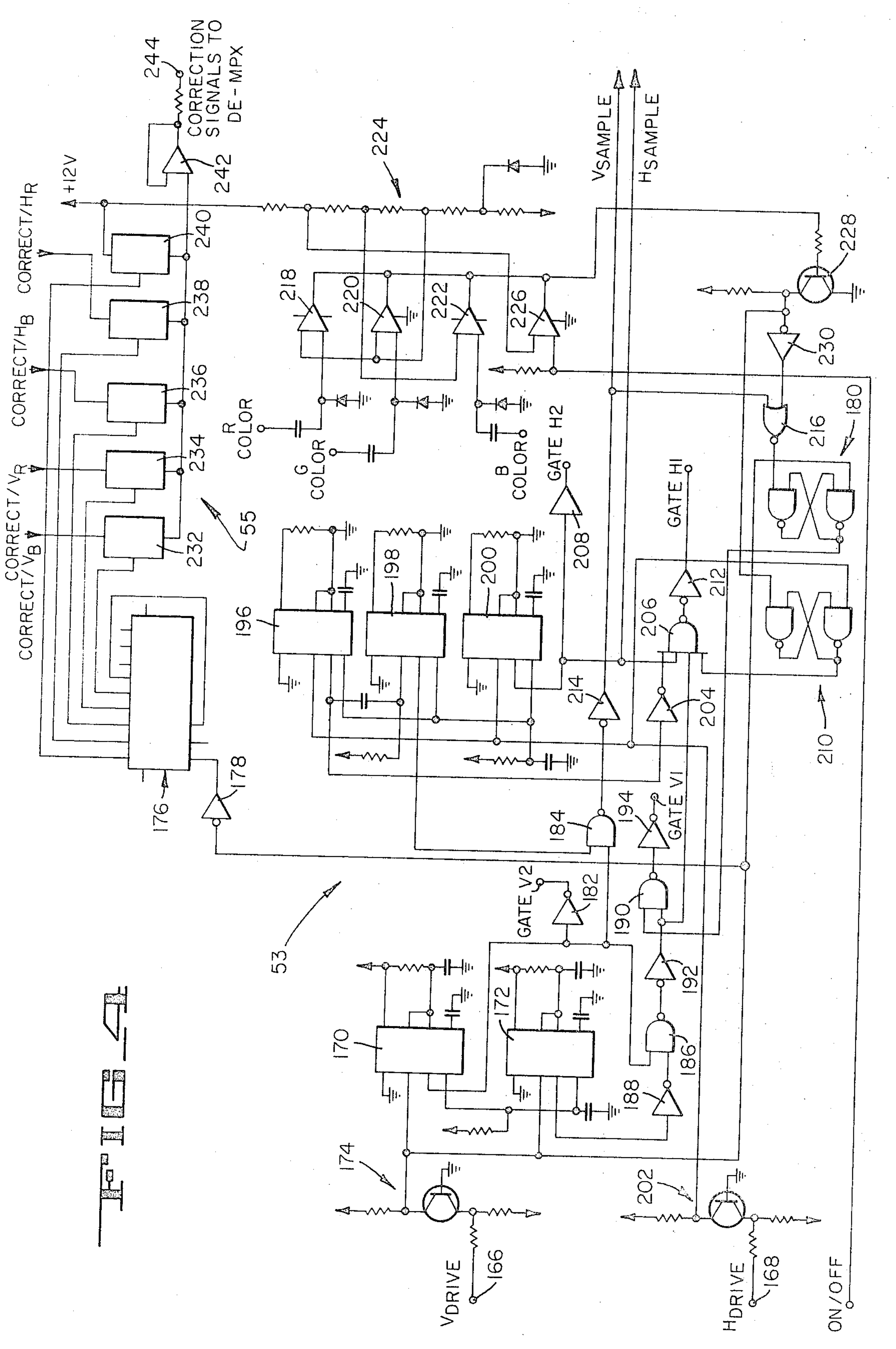

Referring now to FIG. 4, there is shown in greater detail the timing and output circuits 53, 55 respectively, previously shown in the block diagram of FIG. 1. Input signals $V_{DRIVE}$ and $H_{DRIVE}$ are introduced to input terminals 166, 168 respectively, and are derived from conventional tube blanking circuits (not shown) which control the tube scan in the vertical and horizontal directions respectively. $V_{DRIVE}$ is introduced to a pair of (vertical) one-shot circuits 170, 172 via an amplifier stage 174. $V_{DRIVE}$ is also introduced to counter means 176 via an inverter 178, as well as to one side of an R-S NAND latch 180. The output from one-shot 170 is introduced to an inverter 182 whose output provides GATE V2 employed by the circuits of FIGS. 1 and 2. The one-shot 170 output is also delivered to a pair of NAND gates 184, 186. The output from the one-shot 172 is introduced to the second input to NAND gate 186 via a NOT gate 188. The output from NAND gate 186 is introduced to a NAND gate 190 via an inverter 192. The second input to NAND gate 190 is from the output of the latch 180. NAND gate 190 is coupled to an inverter 194 which in turn provides the GATE V1 signal for use in the circuits of FIGS. 1 and 2.

The second input to NAND gate 184 is provided from a one-shot 198 of a series of (horizontal) one-shots 196–200. Inputs to the one-shots are provided via an amplifier stage 202 coupled to input terminal 168 which received the signal $H_{DRIVE}$. One-shot 196 is coupled to an inverter 204 and thence to a NAND gate 206. The output from one-shot 200 is introduced to an amplifier 208 which, in turn, generates the GATE H2 signal employed in the circuits of FIGS. 1 and 3. The output from one-shot 200 is also introduced as one input to the NAND gate 206, and is further extracted as the signal $H_{SAMPLE}$ which is introduced to the circuits of FIGS. 1 and 3. The output from inverter 192 is also introduced as an input to the NAND gate 206. The output from the amplifier stage 202 is further introduced to a second R–S NAND latch 210, whose output is fed to NAND gate 206. NAND gate 206 is coupled to an inverter 212 whose output provides GATE H1 employed in the circuits of FIG. 1 and 3. The output from NAND gate 184 is introduced to an inverter 214 which provides the signal $V_{SAMPLE}$ employed in the circuits of FIGS. 1 and 2. $V_{SAMPLE}$ is also fed to a NOR gate 216, which provides the second input to the latch 180.

The three signals R, G and B COLOR, (shown in FIGS. 1 and 3), are introduced to respective comparators 218–222, whose second inputs are coupled to selected voltage levels of a voltage divider network 224. An operational amplifier 226 is coupled to a level of the divider 224, with the other input thereof coupled to an external inhibit signal ON/OFF. The outputs of the comparators 218–222 and 226 are commonly coupled to a transistor 228, whose output in turn is coupled to a second input to latch 210, as well as to the second input of NOR gate 216 via an inverter 230. The function of the comparator circuit (218–226)is to inhibit updating of the correction signal if any of the image tubes is overloaded.

Regarding the output circuit 55, the counter 176 of previous mention is coupled to a series of output gates 232–240 to sequentially clock the latter to provide the error correction signals $V_B$, $V_R$, $H_b$ and $H_R$ in selected time sequence for transmission down a single wire of the camera cable. To this end, the blue and red error correction signals ($V_B$, $V_R$) from the vertical centering circuit of FIG. 2 are introduced to the gates 232, 234 respectively, while the blue and red error correction signals ($H_B$, $H_R$) from the horizontal centering circuit of FIG. 3 are introduced to the gates 236, 238 respectively. Gate 240 is coupled to +12 volta input for use as a sync pulse when decoding the multiplex at the camera head. The common output of gates 232–240 are coupled via amplifier 242 to a system output terminal 244.

The camera head provides a demultiplexer (not shown) which separates the correction signals, whereupon these correction signals are introduced into the tube scan apparatus so as to bring the error signals at the comparators 34, 36 within the dead zone. Obviously, a plurality of wires could be used in place of the output (multiplexer) circuit 55 to introduce the correction signals to the tube scan apparatus.

Note the invention combination may be employed as vertical or horizontal centering circuits, or in combination. Likewise the circuits may be used, for example, in two tube color cameras, to correct for mis-centering between the luminance signal and color signal(s), or in three or four tube color cameras with a corresponding number of circuits. The invention may further be employed with combinations of tube and solid state detector devices.

Various modifications to the circuit elements include deletion of the lowpass filters 30, 32; a motor potentiometer could be used in place of the up/down counter means 40, 42; the comparators 34, 36 could be referenced to ground rather than to the divider networks 118 if other logic theory were applied; integration may be performed with additional lowpass filtering, but the latter device is not gateable as is that described above. The combination of the up/down counters and the comparators, provide storage of information via the counters when there is no picture information available. That is, since the comparators drive the counters when there is no information available, the comparators are in the "dead" zone, and the counters maintain their previous states, i.e., act as storage.

What is claimed is:

1. An automatic centering system for correcting any mis-centering between the color component images of a multiple tube color camera, wherein the camera generates selected color signals within respective color channels in response to the number and properties of the tubes, and corrections are applied via the tube scan apparatus, comprising;

first means for continuously generating a first derivative from at least one of the color signals of a respective color channel;

multiplier means for receiving the first derivative and at least one other color signal from another color channel and for continuously multiplying the first derivative of one color channel by the color channel of a different color channel to provide continuous error signals indicative of any mis-centering between the color signals of the different color channels;

comparator means operatively coupled to the multiplier means for cintinuously comparing the error signals to a selected threshold reference to generate correction signals commensurate with the error signals, wherein the correction signals are applied to the tube scan apparatus to correct any mis-centering between the color component images.

2. The centering system of claim 1 further including gateable integrator means operatively coupled to the multiplier means to provide selected integration and thus an averaging of the error signals for subsequent comparison with the selected threshold reference via the comparator means.

3. The centering system of claim 2 further including gating means integral with the gateable integrator means to apply the integrated error signals to the comparator means for comparison with the selected DC voltage threshold reference.

4. The centering system of claim 3 further including chopper means coupled to selected color signals prior to the multiplier means and to the first means to establish a zero DC reference level for respective color signals.

5. The centering system of claim 3 further including voltage divider means for providing the selected threshold reference coupled to the gating means, and further coupled to the comparator means to provide upper and lower threshold levels with respect to the selected threshold reference.

6. The centering system of claim 4 further including timing means operatively coupled to the comparator means, to the gateable integrator means and to the chopper means to sequentially gate the system.

7. The centering system of claim 5 further including up/down counter means operatively coupled to the comparator means and responsive to variations of the error signals relative to the upper and lower threshold levels to generate a digital word indicative of the error signals.

8. The centering system of claim 7 further including D/A converter means coupled to the counter means for generating the correction signals in the form of an analog voltage which is proportional to the digital word and thus to the error signals.

9. The centering system of claim 8 further including filter means associated with each color signal of respective color channels for removing low frequency components which are not related to video picture transitions and to eliminate sampling transients.

10. The centering system of claim 4 further including sample/hold means for receiving each of the color signals, and responsive to the chopper means to selectively sample color signal information down the picture; said chopper means being gated at a preselected rate.

11. The centering system of claim 4 wherein the color camera is centered in both the horizontal and vertical directions; wherein the first means, the multiplier means, the comparator means, the gating means, the gateable integrator means, and the chopper means are disposed to provide both a horizontal and vertical centering circuit, wherein associated horizontal and vertical correction signals are introduced to respective tube scan apparatus.

12. The centering system of claim 11 further including sample/hold means disposed to receive the color signals in the vertical circuit, said chopper means being responsive to a selected input signal and coupled to the sample/hold means to sample the associated color signal and establish the zero DC reference level; and wherein the chopper means of the horizontal circuit is coupled to a color signal prior to the first means for obtaining the derivative thereof to establish the zero DC reference level.

13. The centering system of claim 12 wherein the vertical and horizontal circuits include RGB color signals introduced to respective channels, the system further including, bandpass filter means and highpass filter means coupled to the sample/hold means in the vertical circuit and to the chopper means in the horizontal circuit, respectively; said means for obtaining a first derivative being disposed in two channels of the vertical circuit, the vertical multipliers means being disposed to multiply each of the two derivatives by the remaining color signal to define a pair of vertical error signals; said means for obtaining a first derivative being disposed in one channel of the horizontal circuit, the horizontal multiplier means being disposed to multiply the first derivative by each of the remaining color signals to define a pair of horizontal error signals.

14. The centering system of claim 13 further including; a first amplifier stage coupled to the multiplier means of the vertical and horizontal circuits, the gateable integrator means being coupled to respective first amplifier stages; coupling capacitor means coupled to the integrator means and thence to the gating means; said comparator means being coupled to respective coupling capacitor means via associated gating means; up/down counter means coupled to respective comparator means and adapted to count up or down in response thereto, wherein said counter means generates respective digital words indicative of the vertical and horizontal corrections signals.

* * * * *